United States Patent
Gupte et al.

(10) Patent No.: US 10,841,239 B2
(45) Date of Patent: *Nov. 17, 2020

(54) POLICY BASED SELECTION OF RESOURCES FOR A CLOUD SERVICE

(71) Applicant: Hewlett Packard Enterprise Development LP, Houston, TX (US)

(72) Inventors: Prashant Gupte, Sunnyvale, CA (US); Robin Sabi Rajan Bejgum, Hyderabad (IN); Stephane H. Maes, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/042,289

(22) Filed: Jul. 23, 2018

(65) Prior Publication Data

US 2018/0331975 A1 Nov. 15, 2018

Related U.S. Application Data

(63) Continuation of application No. 14/914,297, filed as application No. PCT/US2013/058044 on Sep. 4, 2013, now Pat. No. 10,033,662.

(51) Int. Cl.
*G06F 15/173* (2006.01)
*H04L 12/911* (2013.01)
*H04L 12/927* (2013.01)
*H04L 29/08* (2006.01)

(52) U.S. Cl.
CPC ............ *H04L 47/82* (2013.01); *H04L 47/805* (2013.01); *H04L 47/808* (2013.01); *H04L 67/10* (2013.01)

(58) Field of Classification Search
USPC .......................................................... 709/226
See application file for complete search history.

(56) References Cited

U.S. PATENT DOCUMENTS 8,495,197 B1   7/2013 Nagargadde et al.
8,769,644 B1 * 7/2014 Eicken ................ H04L 67/1097
                                                          709/225

(Continued)

FOREIGN PATENT DOCUMENTS

CN    101094158 A    12/2007
CN    102255933 A    11/2011

(Continued)

OTHER PUBLICATIONS

Chapman, C. et al., Software Architecture Definition for On-demand Cloud Provisioning, Sep. 12, 2010, 21 pages, http://www.ee.ucl.ac.uk/~sclayman/docs/ClusterComp2011.pdf.

(Continued)

*Primary Examiner* — Anthony Mejia
(74) *Attorney, Agent, or Firm* — Hewlett Packard Enterprise Patent Department (57) ABSTRACT

Selecting resources for a cloud service can include defining a specific resource provider constraint parameter, determining a parameter value for the specific resource provider constraint parameter, analyzing a plurality of specific resource providers and selecting a specific resource provider from the plurality of available specific resource providers based on the analysis and using a best-fit model.

20 Claims, 6 Drawing Sheets

(56) References Cited

U.S. PATENT DOCUMENTS

| | | | |
|---|---|---|---|
| 8,776,013 B2* | 7/2014 | Riehl | G06F 9/45516 |
| | | | 717/108 |
| 9,363,154 B2* | 6/2016 | Akolkar | H04L 41/147 |
| 9,647,904 B2* | 5/2017 | Lissack | H04L 41/5051 |
| 9,667,472 B2* | 5/2017 | Meng | H04L 67/32 |
| 10,033,662 B2* | 7/2018 | Gupte | H04L 67/10 |
| 10,033,785 B2* | 7/2018 | Lee | H04L 65/60 |
| 10,044,808 B2* | 8/2018 | Yendluri | G06F 9/5072 |
| 10,148,530 B2* | 12/2018 | Chatterjee | H04L 67/1097 |
| 2009/0288084 A1 | 11/2009 | Astete et al. | |
| 2010/0198730 A1 | 8/2010 | Ahmed et al. | |
| 2010/0319004 A1* | 12/2010 | Hudson | G06F 9/5072 |
| | | | 719/313 |
| 2010/0325199 A1 | 12/2010 | Park et al. | |
| 2010/0332262 A1 | 12/2010 | Horvitz et al. | |
| 2011/0238515 A1 | 9/2011 | Diwakar et al. | |
| 2011/0289479 A1 | 11/2011 | Pletter et al. | |
| 2011/0320606 A1 | 12/2011 | Madduri et al. | |
| 2012/0185913 A1 | 7/2012 | Martinez et al. | |
| 2012/0324092 A1 | 12/2012 | Brown et al. | |
| 2012/0331524 A1 | 12/2012 | Mower et al. | |
| 2013/0007272 A1 | 1/2013 | Breitgand et al. | |
| 2013/0036213 A1 | 2/2013 | Hasan et al. | |
| 2013/0060933 A1 | 3/2013 | Tung et al. | |
| 2013/0066945 A1 | 3/2013 | Das et al. | |
| 2013/0305376 A1* | 11/2013 | Chauhan | G06F 21/577 |
| | | | 726/25 |
| 2014/0244311 A1* | 8/2014 | Dawson | G06Q 10/0635 |
| | | | 705/4 |
| 2015/0142978 A1* | 5/2015 | Anderson | G06F 9/5044 |
| | | | 709/226 |
| 2016/0212020 A1* | 7/2016 | Gupte | H04L 41/5054 |

FOREIGN PATENT DOCUMENTS

| | | |
|---|---|---|
| CN | 102915331 A | 2/2013 |
| WO | WO2014007810 | 1/2014 |
| WO | WO2014088544 | 6/2014 |
| WO | WO2015034481 | 3/2015 |
| WO | WO2015034484 | 3/2015 |
| WO | WO2015034485 | 3/2015 |
| WO | WO2015034487 | 3/2015 |

OTHER PUBLICATIONS

Cisco Systems, Inc., Glue Networks Deployment Guide for the Cisco Next-generation WAN, May 1, 2013, 29 pages http://www.cisco.com/en/US/docs/solutions/Enterprise/WAN_and_MAN/GlueNtwksDepGuide.pdf.

Gupte, et al., "Providing Services as Resources for Other Services", PCT Application No. PCT/US2013/058043, filed Sep. 4, 2013, 31 pages.

Gupte, et al., "Generic Resource Provider for Cloud Service", PCT Application No. PCT/US2012/067596, filed Dec. 3, 2012, 22 pages.

Gupte, et al., "Providing Recursively-Generated Instantiated Computing Resource in a Multi-Tenant Environment", PCT Application No. PCT/US2013/058036, filed Sep. 4, 2013, 35 pages.

Gupte, et al., "Providing Resources to Customers Via Node-Relationship Models", PCT Application No. PCT/US2013/058014, filed Sep. 4, 2013, 37 pages.

Gupte, et al., "Selection of Resource Providers for Multi-Tenancy Provision of Building Blocks", PCT Application No. PCT/US2013/058048, filed Sep. 4, 2013, 32 pages.

International Search Report and Written Opinion, PCT Patent Application No. PCT/US2013/058044, dated Jun. 9, 2014, 10 pages.

Maes, et al., "Managing a Cloud Service", PCT Application No. PCT/US2012/045424, filed Jul. 3, 2012, 23 pages.

Mietzner, R. et al., Towards Provisioning the Cloud: On the Usage of Multi-Granularity Flows and Services to Realize a Unified Provisioning Infrastructure for SaaS Applications, IEEE Congress on Services, Jul. 6-11, 2008, 8 pages.

Tsai, W-T et al., Service-oriented Cloud Computing Architecture, 2010 7th International Conference on Information Technology, Apr. 12-14, 2010, 10 pages.

VMware, Inc., VMware vCloud® Architecture Toolkit Operating a VMware vCloud, Oct. 2011, 92 pages http://www.vmware.com/files/pdf/vcat/Operating-VMware-vCloud.pdf.

* cited by examiner

Fig. 7

POLICY BASED SELECTION OF RESOURCES FOR A CLOUD SERVICE

PRIORITY INFORMATION

This application is a continuation of U.S. National Stage application Ser. No. 14/914,297 filed on Feb. 25, 2016, which claims priority to International Application No. PCT/US2013/058044 filed on Sep. 4, 2013. The contents of which are incorporated herein by reference in its entirety.

BACKGROUND

A cloud service generally refers to a service that allows end recipient computer systems (e.g., thin clients, portable computers, smartphones, desktop computers and so forth) to access a pool of hosted computing and/or storage resources (e.g., the cloud resources) and networks over a network (e.g., the Internet). In this manner, the host, a cloud service provider, may, as examples, provide Software as a Service (SaaS) by hosting applications; Infrastructure as a Service (IaaS) by hosting equipment (e.g., servers, storage components, network components, etc.); or a Platform as a Service (PaaS) by hosting a computing platform (e.g., operating system, middleware, data bases, autoscaling infrastructure, etc.).

A typical cloud service incurs charges on a demand basis, is managed by the cloud service provider and may be scaled (e.g., scaled according to desired storage capacity, processing power, network bandwidth and so forth) by the end user. The cloud service may be a public service (e.g., an Internet-based service) that is generally available to all potential users or a limited access private service that is provided over a private network (e.g., a business enterprise network) as well as a managed cloud service—private or hosted—(e.g., a virtual private cloud service) or a hybrid cloud service (a cloud service that is a combination of the above). Traditionally, when a user orders a cloud service, the user may manually perform various actions related to deploying and configuring software associated with the ordered cloud service (e.g., deployment of virtual machines (VMs), middleware, application software, application components, and so forth) on the provisioned/instantiated infrastructure. Additionally, requests can be received from other applications or systems via Application Programming Interfaces (APIs).

DETAILED DESCRIPTION

An organization may employ a cloud service manager to offer and deliver (e.g., instantiate, provision, and deploy) services and manage the lifecycles of cloud services for end users. As used herein, managing the lifecycles of cloud services can include managing the building of a cloud service, ongoing management of an existing cloud service, reporting, metering, and/or auditing, for example, More particularly, a cloud service manager can orchestrate the use of APIs of existing cloud services for managing the lifecycles of the existing cloud services and combinations of the existing cloud services for users of end systems (e.g., desktops, portable computers, smartphones, clients, thin clients, servers). As used herein, a service design can include a set of actions to instantiate the cloud capability as well as a collection of resources to be utilized in the instantiation of the cloud capability.

Depending on the particular implementation, the selection and ordering of cloud lifecycle management services may be performed by a given user (e.g., an administrator) for a group of end users (e.g., users of an enterprise), or the selection and ordering of the cloud capabilities may be performed by a given user (e.g., an Internet-based user or employee) for the given user's individual use. Users of the cloud service manager may select and order cloud capabilities through the cloud service manager. In some examples, an application or system may select and order cloud capabilities. Cloud capabilities, as used herein, refers to existing cloud services, combinations of existing cloud services that are supported by existing cloud resources, as well as lifecycle management services that are offered and delivered by the cloud service manager. The cloud capabilities may be associated with services that are associated with a "cloud", which may be a public cloud (e.g., a cloud formed from an Internet-based network and which provides hosted cloud services that are generally available to members of the public), a private cloud (e.g., a cloud formed from a private, limited access network (such as an enterprise network) which provides hosted cloud services to a limited group of members), a virtual private cloud (e.g., a cloud formed from a public network providing hosted cloud services to a limited group of members), and/or a hybrid cloud (e.g., a cloud formed from a combination of two or more of the aforementioned clouds). Examples of clouds are not so limited, however, and a cloud may include a number of different types of, and/or combinations of, distributed computing systems. As used herein, "a" or "a number of" something can refer to one or more such things.

Some cloud service managers enable users to request cloud capabilities then manage the resulting subscription via user interaction through a user portal or other interface. Such cloud service managers utilize systems to instantiate and manage a cloud capability, and may define optimum resources to perform a particular service. However, there are management systems that are unable to deploy provisioned systems based on parameters determined at run-time. In systems in which the specific provider is resolved at design time, service designs are locked in at the time of design.

In contrast, in accordance with various embodiments of the present disclosure, a generic resource provider can be implemented using any orchestrator, that is, including management orchestrators that do not support dynamic selection of providers. In using a generic resource provider, a user can add policies to constrain the selection of specific resource providers used with a blueprint. Additionally, a best-fit model can be utilized to select resources (e.g., server, storage, network, security, application install, monitoring and managing) based on multiple criteria like Quality-Of-Service (QoS), business policies (e.g., spend limits, preference for use of a private or public cloud, preference for resource utilization based on departmental unit), Service Level Agreements (SLAs) and other constraints or contextual considerations at run time (e.g., during execution of a program and/or combination of programs).

Selecting a specific resource provider to perform a task at "run-time" instead of "design time" (e.g., definition of resources to provide a capability) provides a number of advantages. For example, it allows a better separation of concerns between the various roles and functions. Once the design has been established, the underlying provider infrastructure (and/or selected supporting services) can be changed without affecting a given service. No change is needed to the service design, across any of the different cases supported by the policies. Additionally, all of the complexities of specific resource providers and the policies that they support are abstracted to functional requirements, such that designers can work with one provider for a given resource type with a single set of offerings. In this manner, the deployment of a cloud service is controlled by modifying or adding to the set the business policies and QoS parameters in the service blueprint and offering, which in turn drives the selection of the specific resource provider.

Figure 1:
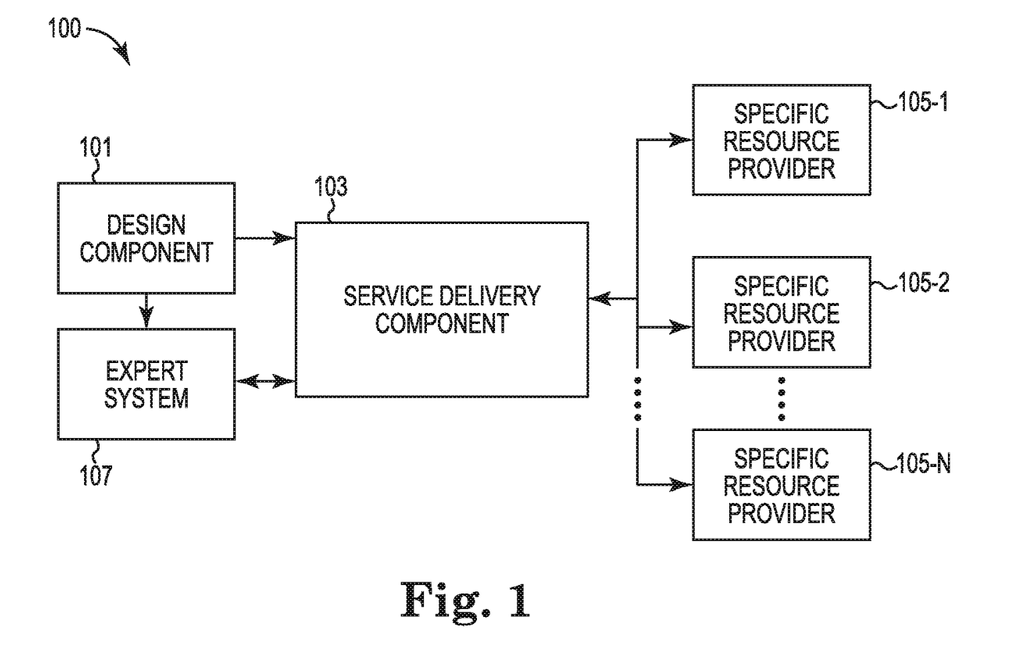
FIG. 1 is a diagram of an example of an environment for selecting resources for a cloud service provisioning system according to the present disclosure.

FIG. 1 is a diagram of an example of an environment 100 for selecting resources for a cloud service provisioning system according to the present disclosure. The environment 100 can include a design component 101 configured to create a service design for a cloud capability in collaboration with a user. A service design can include a set of actions to instantiate the cloud capability as well as a collection of resources to be utilized in the instantiation of the cloud capability. However, examples are not so limited, and a service design can include a set of actions to manage any stage of a cloud service lifecycle, including updating, monitoring, destruction, retirement, and/or de-subscription. As used herein, a resource refers to a cloud resource and can include a server, data storage devices, network devices, security applications, an application install, a monitoring device, and/or a managing device. However, examples are not so limited and a resource can include a number of different software and/or hardware components.

In a number of examples of the present disclosure, a service design can be defined and provided to a service delivery component 103 for implementation as a cloud service. The service design, rather than associating the provided services with specific cloud resources, can include a number of generic resource providers. In such examples, the generic resource provider can be selected based on a particular service to be provided, and a number of parameters can be associated with the generic resource provider to select a specific resource provider (e.g., 105-1, 105-2, . . . , 105-N). As used herein, a parameter can include a consideration and/or constraint used to identify a specific resource provider from a number of different generic resource providers. A parameter can include a number of considerations, such as QoS requirements (e.g., an amount of storage space, bandwidth, priority, overall load of system and processing capacity), SLAB, business policies (e.g., any policy defined by a business), and/or contextual considerations (e.g., type of application and security requirements, location, who is allowed to use what (e.g., tiered offerings)). A parameter can include a categorical parameter, an ordinal value, an interval value, and/or a ratio value. In some examples, a parameter may be provided with a request to a generic resource provider. In other words, a parameter can information obtained from a service request submit by a user and/or other application.

As used herein, a generic resource provider represents a cloud resource in the abstract, according to its associated function, which is not tied to a specific type, location, or resource. For instance, the service design may include a generic resource provider of a server type (e.g., a generic server resource), without restricting the resource to a specific physical server assembly or even restricting it to a physical or virtual implementation. A number of different types of generic resource providers can be available for use in a given service design, including for example, server resources, network structures, data storage, software applications, monitoring, and management interfaces.

In a number of examples, a specific resource provider (e.g., specific resource provider 105-1), can be selected from a plurality of available specific resource providers (e.g., 105-1, 105-2, . . . 105-N). As used herein, a specific resource provider refers to a specific set of physical or virtual cloud resources that can be used to perform an associated function, and unlike a generic resource provider, is tied to a specific location and type of resource. For instance, both physical and virtual servers can represent specific resource providers for a generic server (e.g., a generic resource provider of a server type), and one specific server resource that might be associated with a generic server may include a physical server assembly located in a particular data center. Once the specific resource provider (e.g., 105-1) is selected, the service delivery component 103 can instruct each generic resource provider selected at the design component 101 to implement all public actions exposed by the selected specific resource provider 105-1, effectively transforming it into an instantiation of the specific resource provider 105-1.

Selection of a specific resource provider for each generic resource provider can be performed by an expert system 107, in communication with the service delivery component 103. In such examples, the expert system 107 can select the specific resource provider based on a number of parameters derived from the service design. Further, the expert system 107 can include a rule-based expert system that determines an appropriate specific provider for each generic resource provider according to a number of rules, discussed further in relation to FIGS. 5 and 6.

Figure 2:
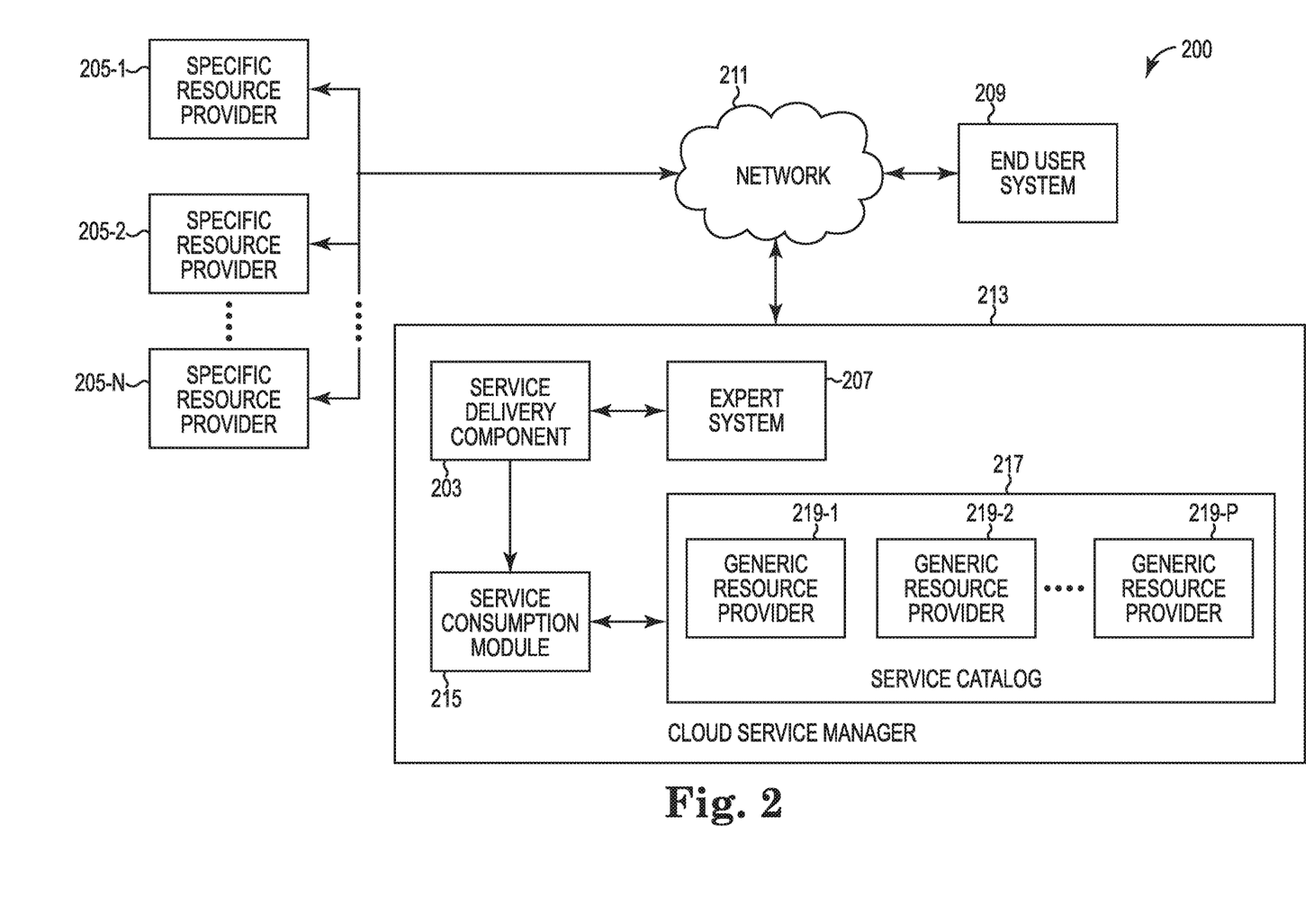
FIG. 2 is a diagram of an example of an environment for selecting resources for a cloud service provisioning system using a cloud service manager, according to the present disclosure.

FIG. 2 is a diagram of an example of an environment 200 for selecting resources for a cloud service provisioning system using a cloud service manager 213, according to the present disclosure. The cloud service manager 213 can offer and deliver (e.g., instantiate, provision, and deploy) services to manage the lifecycles of existing cloud services and combinations of existing cloud services for end users.

As depicted in FIG. 2, a cloud service manager 213 may be accessed by a given end user system 209 via a network 211. The network 211 can include one or more of a local area network (LAN), a wide area network (WAN), and/or the Internet. Accordingly, the cloud service manager 213 may reside on an Internet server, on a server within a private LAN, on a server within a WAN, on a desktop computer, and/or may be offered as Software as a Service (SaaS).

In a number of examples, a user of the cloud service manager 213 may select and order cloud capabilities through the cloud service manager 213. The cloud service manager 213 can include a service consumption module 215. The service consumption module 215 can include a storefront and/or a marketplace that enables users to browse and select offered cloud capabilities. Further, through the service consumption module 215, users can perform a number of actions. For instance, through the service consumption module 215, users can customize (e.g., configure) details of the selected cloud capabilities, agree to terms and/or conditions for receiving the selected cloud capabilities, and/or order the cloud capabilities (e.g., subscribe to the capabilities and/or pay for the capabilities). Further, through the service consumption module 215, users can build and/or modify a cloud design by specifying a way to combine multiple cloud capabilities or provide lifecycle management. Users can subsequently use the service consumption module 215 to update the cloud capabilities, scale up and scale down the cloud capabilities, and perform other functions to manage the lifecycle of a number of cloud capabilities.

To facilitate user selection and control of cloud capabilities, a service consumption module 215 can access one or more cloud service catalogs 217. As used herein, a cloud service catalog 217 can include a database of available cloud capabilities. In a number of examples, the cloud service catalog 217 can include a federation and/or aggregation of catalogs. A user may browse the cloud service catalog 217 by accessing a graphical user interface (GUI).

Through a service consumption module 215, a user may select combinations of various generic resource providers (e.g., 219-1, 219-2, . . . , 219-P) to form a selected set of cloud services and/or to set up a service to manage the lifecycle of this combination for a given user or group of users. As examples, the generic resource providers 219-1, 219-P can include Infrastructure as a Service (IaaS) resources (e.g., servers, storage components and network components), PaaS resources (e.g., resources that provide a hosted computing platform such as operating systems, hardware, and storage), SaaS resources (e.g., resources that provide hosted applications), and/or DataBase as a Service (DBaaS) resources (e.g., which provide a hosted database as a service). Each generic resource provider 219-1, . . . , 219-P may not be tied to a specific physical or virtual resource, but may instead be a generic placeholder for a resource or set of resources needed to provide the selected cloud resource.

As described in relation to FIG. 1, the cloud service manager 213 includes a service delivery component 213 to deliver services that are described in the service catalog 217 and are selected by users. In some examples, using the number of available cloud resources and their resource offerings and actions, cloud service administrators can construct plans (e.g., service blueprints) which can be stored in memory associated with the service delivery module and which can set forth structured plans of automated actions for instantiating, configuring, and/or managing the cloud capabilities that are described and offered in the service catalog 217. As used herein, a service blueprint includes a set of workflows, recipes, and/or scripts that correspond to particular lifecycle management actions that may be performed to orchestrate the APIs of the appropriate cloud resources for purposes of managing the lifecycle of a given cloud capability.

For a given service blueprint, the service delivery component 203 may automatically undertake the actions to instantiate and configure an associated cloud capability, thereby limiting manual actions by the users pertaining to instantiation and configuration of the selected cloud capability. In such examples, the generic resource provider, prior to the selection of a specific provider, can perform a set of actions defined in the blueprint, for example, relating to service topology or the functionality represented by the generic resource. During subscription, the generic resource provider can be essentially transformed into the selected specific resource provider, and may perform resource specific actions associated with the selected specific resource provider. That is, the generic resource provider can point to a specific resource provider, however, examples are not so limited and the generic resource provider can include a service blueprint itself. In a number of examples of the present disclosure, cloud service administrators and/or users may utilize the service delivery component 203 to orchestrate and/or compose multiple blueprints into service blueprints of new cloud capabilities, modify existing service blueprints, and/or construct new service blueprints.

In some examples, a service blueprint may be associated with various commercial terms (e.g., prices, contract periods, and/or terms associated with a SLA), which are stored in subscription components of the service consumption module 215. A service may become a service offering when it is associated with these terms. The terms that accompany a given service blueprint may be described in the service catalog 217, and in some instances may be set forth by a product designer. A given service blueprint may further specify actions that are necessary to handle errors associated with given cloud services and actions necessary to report such errors. In other examples, a given service blueprint may specify how the lifecycle of a given service is monitored and managed.

From a service blueprint, a number of service offerings can be provided to a user at the service consumption module 215 with the selected offering providing a service design for managing or constructing a cloud service. Each service offering can represent additional parameters defining the requirements for selecting and configuring the specific provider. Once a user has selected a service offering, additional parameters can be added according to the identity of the user and a relationship of the user to the system. Additionally, some parameters can be exposed to the user and directly defined via a user interface. Where a parameter has not been defined, a default value for that parameter can be assigned.

A service delivery component 203 can construct a cloud service from a service offering once a number of parameters have been identified. The cloud service manager 213 can utilize a rule-based expert system 207 implementing a best-fit model to select one of a plurality of specific resource providers 205-1, 205-2, 205-N for each generic resource provider in the service offering.

Figure 3:
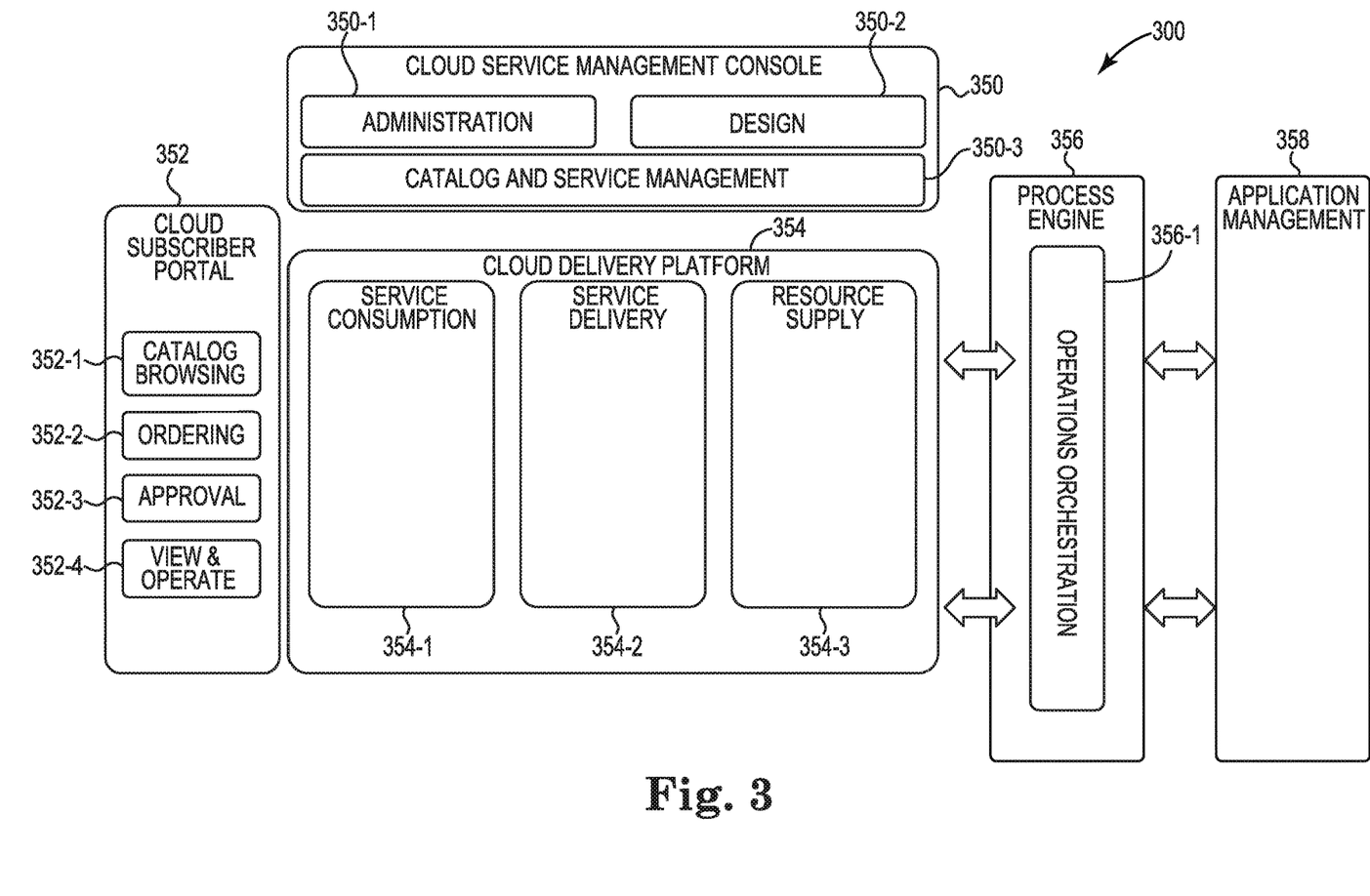
FIG. 3 is another diagram of an example of an environment for selecting resources for a cloud service provisioning system according to the present disclosure.

FIG. 3 is another diagram of an example of an environment 300 for selecting resources for a cloud service provisioning system according to the present disclosure. In a number of examples, policy based selection of resources for a cloud service can be implemented in a cloud service management system (e.g., HP Cloud Service Automation (CSA 3.2), for instance). The cloud service management system can orchestrate the deployment of compute and infrastructure resources and complex multi-tier application architectures or any other cloud service described by a blueprint and/or service design. In a number of examples, the cloud service management system can include a catalog-based subscription process. For instance, a subscriber can request particular cloud service offerings to be implemented in a cloud service. In some examples, a subscriber can modify predefined cloud service offerings, wherein the predefined cloud service offerings include pricing and other customer-specific features.

As shown in FIG. 3, a cloud service management system 300 can include a number of different architectural components. For instance, the cloud service management system can include a cloud service management portal 350, a cloud subscriber portal 352, a cloud delivery portal 354, a process engine module 356, and a number of application management modules 358.

The cloud service management portal 350 can include hardware and/or a combination of hardware and programming to perform a number of different functions to manage cloud services. For instance, the cloud service management console 350 can perform administrative functions using an administration module 350-1, design functions using a design module 350-2, and/or management functions using a catalog and service management module 350-3. The cloud subscriber portal 352 can include hardware and/or a combination of hardware and programming to perform a number of different functions supporting a cloud subscriber. For example, the cloud subscriber portal can perform functions allowing a cloud subscriber to browse a cloud service catalog (e.g., using a catalog browsing module 352-1), order cloud services (e.g., using an ordering module 352-2), approve cloud service offerings (e.g., using an approval module 352-3), and/or view subscriptions (e.g., using a view and operate module 353-3).

The cloud delivery platform 354 can include hardware and/or a combination of hardware and programming to perform a number of different functions to deliver cloud services. For instance, the cloud delivery platform 354 can include a service consumption sub-module (e.g., service consumption sub-module 354-1) including information on cloud service pricing, a catalog of cloud services available, a number of offerings, and/or subscriptions to cloud services. Similarly, the cloud service delivery platform 354 can include a service delivery sub-module (e.g., service delivery sub-module 354-2) that can include information on service blueprints, cloud service components, instances, and/or bindings. Further, the cloud service delivery platform 354 can include a resource supply sub-module (e.g., resource supply sub-module 354-3) that can include information on resource pools, cloud service providers, cloud service offerings, and/or cloud service subscriptions.

In a number of examples, the cloud management system 300 can include a process engine 356. The process engine 356 can include hardware and/or a combination of hardware and programming to orchestrate cloud service management operations (e.g., using an operations orchestration module). For instance, unlike other cloud service management systems, process engine 356 can implement policy based selection of resources for a cloud service, as illustrated in FIGS. 1-2, and 5-7. In some examples, process engine 356 can use a generic resource provider to dynamically select service providers based on a number of different policies. Further, the cloud management system 300 can include an application management system 358. The application management system 358 can include hardware and/or a combination of hardware and programming to manage applications.

Figure 4:
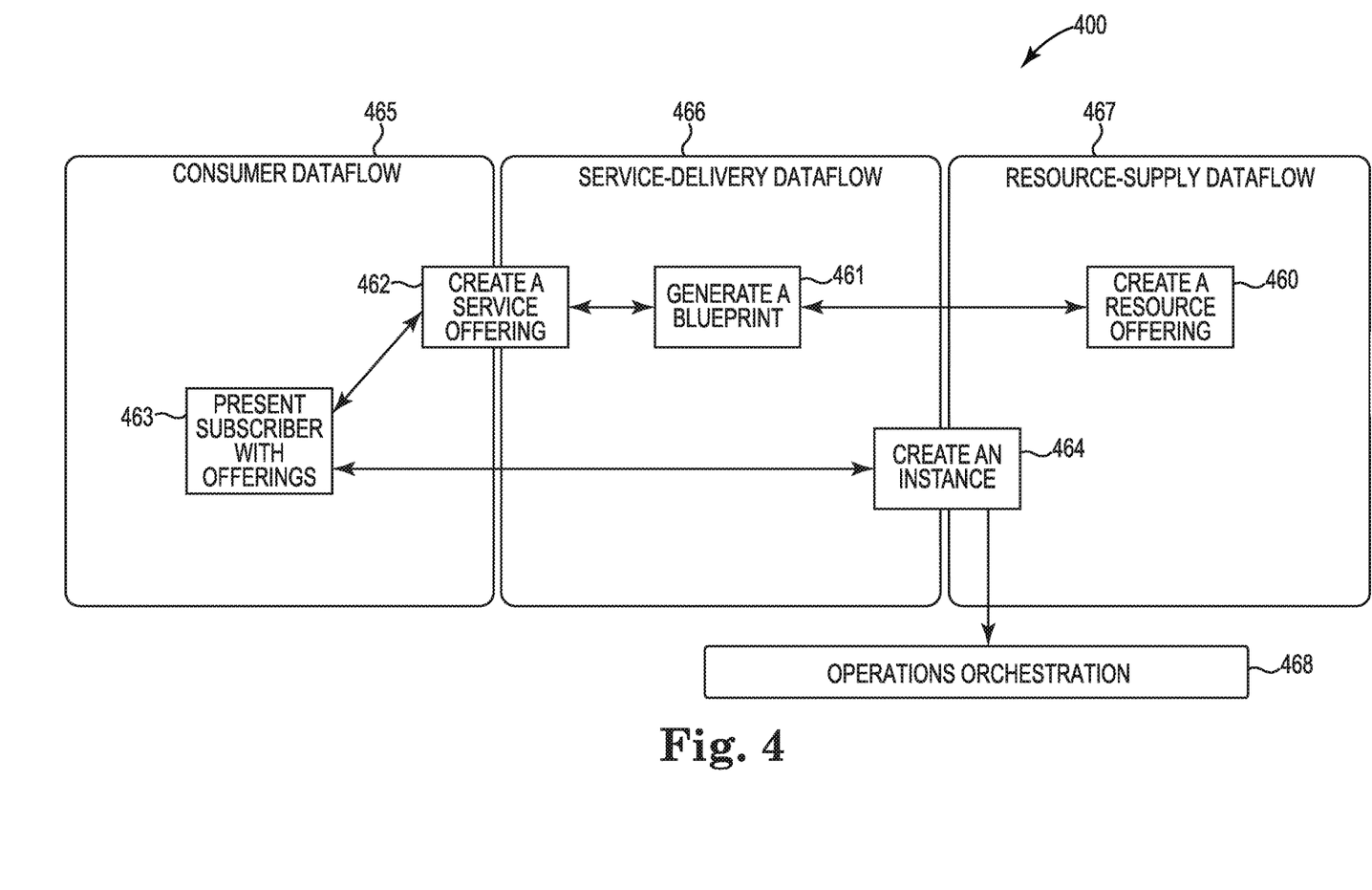
FIG. 4 illustrates a flow chart for selecting resources for a cloud service according to the present disclosure.

FIG. 4 illustrates a flow chart for selecting resources for a cloud service according to the present disclosure. As shown in FIG. 4, a cloud service management system 400 can manage the flow of information between a subscriber (e.g., via a consumer dataflow 465), a cloud service (e.g., via a service-delivery dataflow 466), and resource providers (e.g., via a resource-supply dataflow 467). For example, at 460, the cloud service management system 400 can generate a resource offering. Generating a resource offering can include creating and/or importing resource offerings from underlying resource providers. At 461, the cloud service management system 400 can generate a service blueprint. Generating a service blueprint can include designing a cloud service, including the configuration, topology, behaviors, resource bindings, and/or service options included in the cloud service. At 462, the cloud service management system 400 can create a service offering. Creating a service offering can include defining pricing for the particular cloud service, defining a number of options related to the cloud service, defining default options related to the cloud service, and/or defining SLA documents related to the cloud service, for instance.

At 463, the cloud service management system 400 can present a subscriber with service offerings for review, approval, and subscription. At 464, the cloud service management system 400 can create an instance of the particular service offerings. Creating an instance of the particular service offerings can include selecting a service component, binding a resource to provide the cloud service, and/or generating a resource subscription. In a number of examples, the instance of the particular service offering and/or the resource subscription for the particular service offerings can be sent to an operations orchestrator 468 for implementation.

In some examples, unlike other cloud service management systems, a generic resource provider can be used to select a specific resource provider based on a number of policies. For instance, the operations orchestrator can use a rule-based algorithm to select a specific resource provider.

Figure 5:
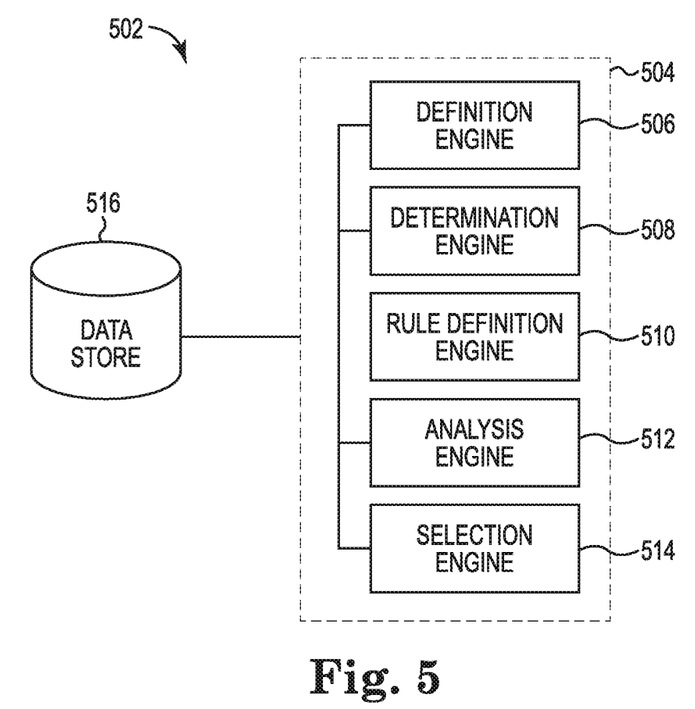
FIGS. 5-6 illustrate examples of systems according to the present disclosure.
Figure 6:
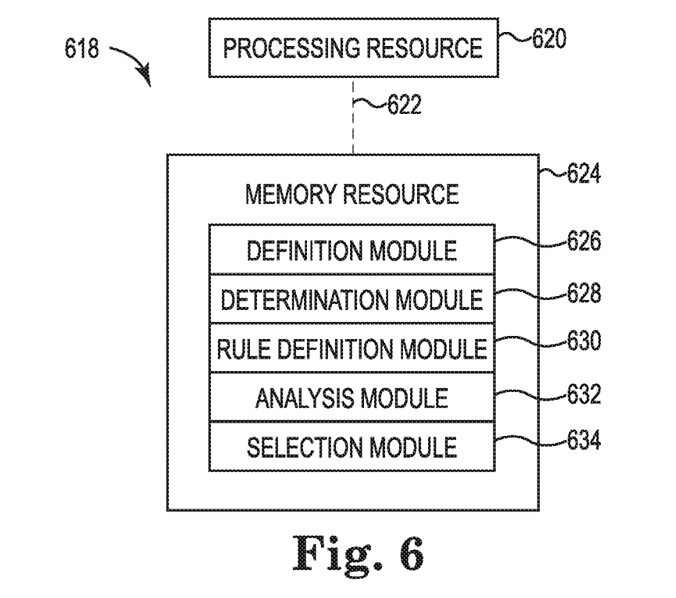

FIGS. 5 and 6 illustrate examples of systems 502, 618 according to the present disclosure. FIG. 5 illustrates a diagram of an example of a system 502 for selecting resources for a cloud service according to the present disclosure. The system 502 can include a data store 516, a management system 504, and/or a number of engines 506, 508, 510, 512, 514. The management system 504 can be in communication with the data store 516 via a communication link, and can include the number of engines (e.g., definition engine 506, determination engine 508, rule definition engine 510, analysis engine 512, selection engine 514, etc.). The management system 504 can include additional or fewer engines than illustrated to perform the various functions described herein.

The number of engines can include a combination of hardware and programming that is configured to perform a number of functions described herein (e.g., define a number of configurable rules based on a number of parameter values). The programming can include program instructions (e.g., software, firmware, etc.) stored in a memory resource (e.g., computer readable medium, machine readable medium, etc.) as well as hard-wired program (e.g., logic).

The definition engine 506 can include hardware and/or a combination of hardware and programming to define a number of specific resource provider constraint parameters. As discussed in relation to FIGS. 1 and 2, a parameter can include a consideration and/or constraint used to identify a specific resource provider from a number of different specific resource providers. Once a specific resource provider is selected, a number of parameters can be provided to the generic resource provider at runtime. Parameters can be defined in a number of ways. In some examples, parameters can be extracted from a service blueprint. These parameters can include values intrinsic to the service design itself, which is assembled by the user from available components in the system. For example, two servers in a disaster recovery service are generally selected to be geographically separated. A parameter detailing this requirement can be determined from the service blueprint. Similarly, certain services can have minimum quality of service requirements, which can be enforced at the design stage.

In some examples, a parameter can be defined by an offering. An offering can include a specific instantiation of a service blueprint. For example, offerings can represent different applications, with the parameters associated with each offering enforcing policy decisions associated with the application. In other examples, a parameter can be defined according to user context. Parameters based on user context can include, for example, parameters reflecting characteristics of the user (e.g., geographic location, type of business, etc.) as well as parameters representing the relationship of the user to the system. For example, the status of a user as a premium customer might be one user context parameter, which might affect providing monitoring or allow for access to specific resources reserved for such customers. In yet other examples, a parameter can be defined by user. For instance, a user might select a number of central processing units (CPUs) on a machine used to provide the specific resource.

The determination engine 508 can include hardware and/or a combination of hardware and programming to determine a parameter value for each of the specific resource provider constraint parameters. In the event that a parameter is not assigned, a default parameter can be assigned. For instance, if four parameters are required to constrain selection of a specific resource provider from a generic resource provider, and only three parameters were provided, a default parameter can be assigned. These default parameters can be inherited from parent object or represent general default parameters assigned to all generic providers of a given type. If no default parameter is available for a given parameter within the set, the process can be halted and the situation brought to the attention of an operator.

In a number of examples, a parameter value can be determined for each parameter. A parameter value can include a string used by the rule-based expert system to select a specific resource provider based on a best fit model. A string can include a sequence of characters (e.g., letters, numerals, symbols and/or punctuation marks) and can be of a finite length.

The rule definition engine 510 can include hardware and/or a combination of hardware and programming to determine a number of configurable rules based on the number of parameter values. A rule can be a set of standards and/or policies that enable a user and/or administrator to select a specific resource provider from a generic resource provider, based on the number of parameters. Rules can vary in complexity and can differ for different types of generic providers. In a number of examples, a plurality of previously defined rules can be stored in a rule database for subsequent use.

Rules can be defined in a number of manners. In some examples, a rule can be defined by a cloud service administrator. For instance, a cloud service administrator can define a number of rules based on business policies and/or QoS constraints, and said rules can be stored in the rule database. In this instance, the rules defined by the cloud service administrator can tie particular resources and respective offerings to the business policies and/or QoS constraints. For example, a rule defined by a business policy may specify that a particular resource must have a cost within a particular threshold (e.g., must cost less than $2,000). In a number of examples, the cloud service administrator can modify and/or update the number of rules based on business policies and/or QoS constraints.

In other examples, a rule can be defined by a user at subscription (e.g., at the time the user subscribes to the service). For instance, at the time of subscription, a user can select a number of options from a plurality of options defining constraints such as business policies and/or QoS constraints. In a number of examples, a rule defined by a user at subscription can be modified and/or configured prior to instantiation of the cloud service.

In yet other examples, a rule can be defined based on the context of the user. For instance, based on the context of the user (e.g., the location of the user, an authorization level of the user, a business unit and/or department of the user), a rule may be pre-selected. For example, a user may be located in Europe, and a rule can be defined requiring that a particular resource utilized by the user (e.g., a database) must also be located in Europe. However, examples are not so limited and a rule defined based on the context of the user can include a number of different rules defined by a characteristic and/or trait of the user. As previously mentioned, rules may be stored in a rule database and may be configured at run-time.

The analysis engine 512 can include hardware and/or a combination of hardware and programming to analyze a plurality of available specific resource providers using the number of configurable rules. The number of rules defined based on the number of parameters selected can be referred to as a complete rule set. Once the complete rule set is defined, a subset of the specific resource providers can be identified referred to herein as the available specific resources. The available specific resources can be those resources that, based on the rules provided, can perform the services desired by the user of the cloud service. For instance, if a rule provides that two servers are always separated spatially, only one of the two servers would be a resource because both could not be selected for instantiation. The analysis engine 512 can utilize a best fit model (e.g., a best fit algorithm) to analyze available specific resource providers. Using the best fit model, the analysis engine 512 can determine a best specific resource provider and/or a best combination of specific resource providers to perform the services. The best fit model may analyze specific resource providers using the rules and based on a variety of metrics, including performance (e.g., response time, latency, etc.), scalability, compatibility and/or interoperability, among other factors.

The selection engine 514 can include hardware and/or a combination of hardware and programming to select a specific resource provider from the plurality of available specific resource providers based on the analysis and using the best-fit model. Once the specific resource provider is selected, the generic resource provider implements the actions instructed by the specific resource provider, thereby transforming itself into an instantiation of the specific provider.

FIG. 6 illustrates a diagram of an example of a computing device 618 according to the present disclosure. The computing device 618 can utilize software, hardware, firmware, and/or logic to perform a number of functions herein.

The computing device 618 can be any combination of hardware and program instructions configured to share information. The hardware for example can include a processing resource 620 and/or a memory resource 624 (e.g., computer-readable medium (CRM), machine readable medium (MRM), database, etc.) A processing resource 620, as used herein, can include any number of processors capable of executing instructions stored by a memory resource 624. Processing resource 620 may be integrated in a single device or distributed across multiple devices. The program instructions (e.g., computer-readable instructions (CRI)) can include instructions stored on the memory resource 624 and executable by the processing resource 620 to implement a desired function (e.g., to define a number of rules based on a number of parameter values).

The memory resource 624 can be in communication with a processing resource 620. A memory resource 624, as used herein, can include any number of memory components capable of storing instructions that can be executed by processing resource 620. Such memory resource 624 can be a non-transitory CRM or MRM. Memory resource 624 may be integrated in a single device or distributed across multiple devices. Further, memory resource 624 may be fully or partially integrated in the same device as processing resource 620 or it may be separate but accessible to that device and processing resource 620. Thus, it is noted that the computing device 618 may be implemented on a participant device, on a server device, on a collection of server devices, and/or a combination of the user device and the server device.

The memory resource 624 can be in communication with the processing resource 620 via a communication link (e.g., a path) 622. The communication link 622 can be local or remote to a machine (e.g., a computing device) associated with the processing resource 620. Examples of a local communication link 622 can include an electronic bus internal to a machine (e.g., a computing device) where the memory resource 624 is one of volatile, non-volatile, fixed, and/or removable storage medium in communication with the processing resource 620 via the electronic bus.

A number of modules 626, 628, 630, 632, 634 can include CRI that when executed by the processing resource 620 can perform a number of functions. The number of modules 626, 628, 630, 632, 634 can be sub-modules of other modules. For example, the definition module 626 and the determination module 628 can be sub-modules and/or contained within the same computing device. In another example, the number of modules 626, 628, 630, 632, 634 can comprise individual modules at separate and distinct locations (e.g., CRM, etc.).

Each of the number of modules 626, 628, 630, 632, 634 can include instructions that when executed by the processing resource 620 can function as a corresponding engine as described herein. For example, the definition module 626 can include instructions that when executed by the processing resource 620 can function as the definition engine 506. In another example, the rule definition module 630 can include instructions that when executed by the processing resource 620 can function as the rule definition engine 510.

Figure 7:
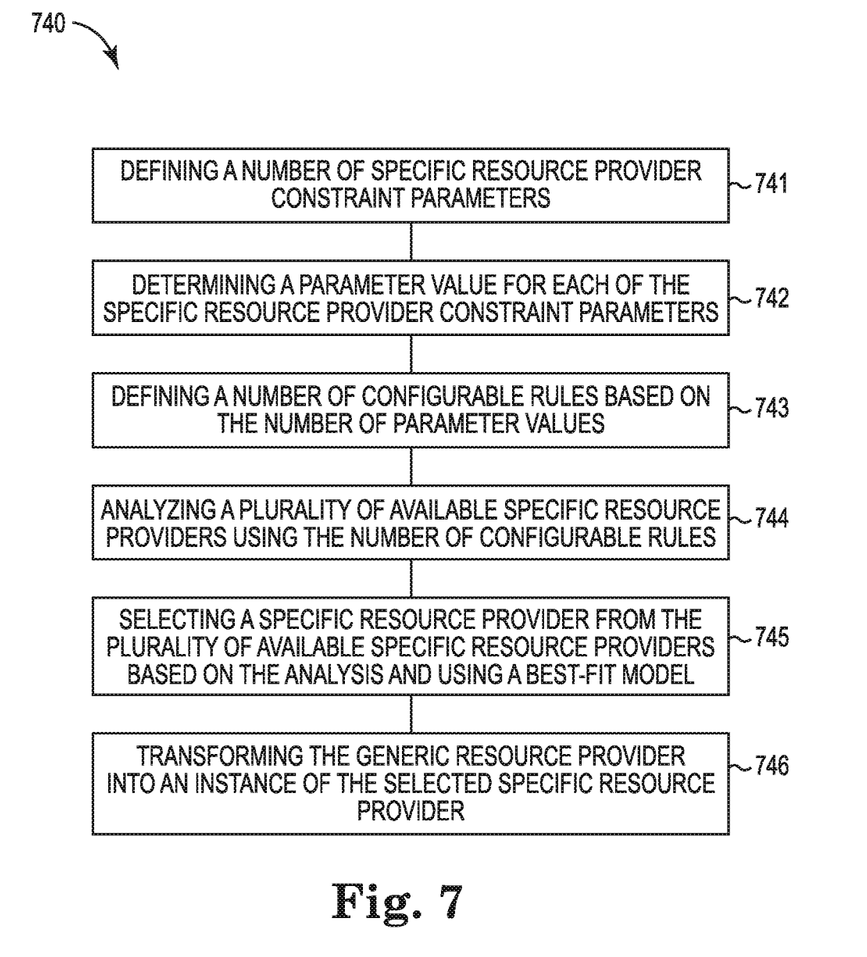
FIG. 7 illustrates a flow chart of an example of a method for selecting resources for a cloud service according to the present disclosure.

FIG. 7 illustrates a flow chart of an example of a method 740 for selecting resources for a cloud service according to the present disclosure. The method 740 can include selecting a generic resource provider from a number of generic resource providers (not shown in FIG. 4). A generic resource provider may be selected based on a type. For instance, a user may select a generic resource provider of a server type. At 741, the method 740 can include defining a number of specific resource provider constraint parameters. A specific resource constraint parameter can include a parameter that constrains a list of available specific resource providers for selection, based on the generic resource provider selected. For instance, if a generic server were selected as the generic resource provider, a number of specific resource providers may be available for use in constructing a cloud service utilizing a server. A number of parameters may reduce the number of specific resource providers available for constructing the cloud service utilizing a server.

At 424, the method 740 can include determining a parameter value for each of the specific resource provider constraint parameters. As discussed in relation to FIGS. 1-2B, a parameter may be determined in a number of ways. A parameter value (e.g., a finite list of characters) can be determined from the parameter, for use in a best-fit model to determine a best specific resource provider for a particular service.

At 743, the method 740 can include defining a number of configurable rules based on the number of parameter values. For instance, based on the parameter values determined at step 424, a number of predefined rules may be selected from a rule database. In other examples, the rules may be constructed based on parameters and/or parameter values input at steps 741-742. The rules may be configurable rules, in that they may be added, deleted, and/or modified by a cloud service administrator and/or user of a cloud service manager. The method 740 can include sending the number of specific resource provider constraint parameters to a generic resource provider (not shown in FIG. 4).

At 744, the method 740 can include analyzing a plurality of available specific resource providers using the number of configurable rules. Based on the generic resource provider selected, a number of specific resource providers may be capable of performing the desired services (e.g., the "available" specific resource providers). Using a best-fit model, the plurality of available specific resource providers may be analyzed using the number of configurable rules to enable selection of a best specific resource provider.

At 745, the method 740 can include selecting a specific resource provider from the plurality of available specific resource providers based on the analysis and using the best-fit model. In some instances, the selection of the specific resource provider may be automatic (e.g., the specific resource provider is selected without user input). In other instances, the selection of the specific resource provider may be based on user input. For example, the method 740 may include presenting a user with a number of 'best' specific resource providers to perform a service in the cloud, and prompting the user to select a one of the number of best specific resource providers for implementation.

At 746, the method 740 can include transforming the generic resource provider into an instance of the selected specific resource provider. Once the specific resource is selected, a service delivery component of the cloud service manager instructs each generic resource provider selected to implement the actions exposed by the selected specific resource provider, transforming it into an instantiation of the specific resource provider. The specific resource provider can then execute the service specified by the user, in collaboration with the provisioned cloud service. The method 740 can further include using the specific resource provider to provision and/or manage an instance of the cloud service, as requested by the user (not illustrated in FIG. 7).

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

In addition, the proportion and the relative scale of the elements provided in the figures are intended to illustrate the examples of the present disclosure, and should not be taken in a limiting sense. As used herein, the designators "N" and "P", particularly with respect to reference numerals in the drawings, indicate that a number of the particular feature so designated can be included with a number of examples of the present disclosure.

What is claimed:

1. A system comprising:
a design component to create a service design to;
  instantiate a cloud capability; and
  manage a cloud service lifecycle; and
a service delivery component to:
  deliver services described within a service catalog;
  store service blueprints;
  select a specific resource provider for each generic resource provider of a plurality of generic resource provider; and
  communicate with a generic resource provider of the plurality of generic resource provider to transform the generic resource provider into an instantiation of the specific resource provider.

2. The system of claim 1, wherein the service delivery component is to construct a cloud service from a service offering.

3. The system of claim 2, wherein the service delivery component is to automatically instantiate an associated cloud capability.

4. The system of claim 3, wherein the service delivery component is to:
  orchestrate multiple blueprints into service blueprints of new cloud capabilities;
  modify existing service blueprints; and
  construct new service blueprints.

5. The system of claim 1, wherein the service delivery component is to implement the service design for implementation as a cloud service.

6. The system of claim 4, wherein the service delivery component is to manage the cloud capability.

7. A non-transitory computer-readable data storage medium executable by a processor to:
  select a specific resource provider from a plurality of available specific resource providers;
  transform a generic resource provider into an instance of a selected specific resource provider by instructing the generic resource provider to perform an action of the selected specific resource provider, wherein the generic resource provider includes a service blueprint;
  access the service blueprint to provide a service offering and produce a service design to manage a cloud service, wherein the service offering represents additional parameters; and
  constrain the selection of the specific resource provider.

8. The non-transitory computer-readable data storage medium of claim 7, wherein the generic resource provider is to perform an action defined in the service blueprint before the selection of the specific resource provider.

9. The non-transitory computer-readable data storage medium of claim 8, wherein the additional parameters define a condition for selecting the specific resource provider.

10. The non-transitory computer-readable data storage medium of claim 9, wherein the service blueprint includes a workflow that correspond to a lifecycle management action.

11. The non-transitory computer-readable data storage medium of claim 7, wherein a service may become the service offering when it is associated with the service blueprint.

12. The non-transitory computer-readable data storage medium of claim 11, wherein the service offering includes an instantiation of the service blueprint.

13. The non-transitory computer-readable data storage medium of claim 12, wherein the service blueprint is to report errors.

14. The non-transitory computer-readable data storage medium of claim 13, wherein the service blueprint is described in a service catalog.

15. The non-transitory computer-readable data storage medium of claim 10, wherein the service blueprint is to specify how a service lifecycle is monitored and managed.

16. The non-transitory computer-readable data storage medium of claim 7, wherein the service blueprint is produced by a product designer.

17. A cloud management system comprising:
a process engine to use a generic resource provider to select a service, wherein the generic resource provider is to transform into an instance of a selected specific resource provider; and
a cloud service delivery platform to:
  deliver a cloud service;
  implement the cloud service; and
  provide information and a subscription on the cloud service.

18. The system of claim 17, wherein the cloud delivery platform includes information on service blueprints, resource pools, cloud service providers, cloud service offerings, cloud service subscriptions and cloud service components.

19. The system of claim 18, wherein a service blueprint is generated by the cloud service management system.

20. The system of claim 17, wherein the generic resource provider is transformed into the instance of the selected specific resource provider at runtime of the cloud system.

* * * * *